United States Patent [19]

Noël

[11] Patent Number: 5,451,423
[45] Date of Patent: Sep. 19, 1995

[54] PREPARATION OF A COOKED CEREAL PRODUCT

[75] Inventor: Jean Noël, Oye-Et-Pallet, France

[73] Assignee: Nestec S.A., Vevey, Switzerland

[21] Appl. No.: 163,274

[22] Filed: Dec. 6, 1993

[30] Foreign Application Priority Data

Jan. 9, 1993 [EP] European Pat. Off. ............ 93100250

[51] Int. Cl.$^6$ ............................................. A23L 1/168
[52] U.S. Cl. .................... 426/618; 426/449; 426/457; 426/510; 426/619; 426/620; 426/621
[58] Field of Search ................ 426/618–620, 426/634, 621, 447, 448, 449, 456, 257, 510, 523, 461, 516

[56] References Cited

U.S. PATENT DOCUMENTS

| | | | |
|---|---|---|---|
| 2,954,296 | 9/1960 | Clausi et al. | 426/559 |
| 3,554,763 | 1/1971 | Fast et al. | 426/620 |
| 3,890,454 | 6/1975 | Nijweide | 426/508 |
| 4,350,714 | 9/1982 | Duvall | 426/559 |
| 4,620,981 | 11/1986 | Gordon et al. | 426/448 |
| 4,732,775 | 3/1988 | Millauer | 426/635 |
| 4,790,997 | 12/1988 | Roush et al. | 426/458 |
| 4,837,112 | 6/1989 | Calandro et al. | 426/463 |
| 4,963,373 | 10/1990 | Fan et al. | 426/74 |
| 5,151,283 | 9/1992 | Foehse et al. | 426/93 |
| 5,176,936 | 1/1993 | Creighton et al. | 426/618 |
| 5,227,248 | 7/1993 | Wullschleger et al. | 426/549 |

FOREIGN PATENT DOCUMENTS

| | | |
|---|---|---|
| 78356 | 5/1971 | Belgium . |
| 2004149 | 6/1990 | Canada . |
| 0016649 | 10/1980 | European Pat. Off. . |
| 2401023 | 7/1974 | Germany . |
| 847677 | 9/1960 | United Kingdom . |

OTHER PUBLICATIONS

European Search Report for EP 9310 0250 (Aug. 1993).

Primary Examiner—Donald E. Czaja
Assistant Examiner—Lien Tran
Attorney, Agent, or Firm—Vogt & O'Donnell

[57] ABSTRACT

A cooked cereal product is made by heating and maintaining a composition having a dry matter content of 20% to 85% by weight and containing water and a starchy substance or soya at a temperature of from 50° C. to 160° C. for from 10 minutes to 180 minutes to obtain a heat-treated composition. The heat-treated composition and a starchy substance or soya are then introduced into an extruder and extrusion-cooked for 20 seconds to 60 seconds at 125° C. to 135 ° C. to obtain a cooked cereal product.

20 Claims, No Drawings

PREPARATION OF A COOKED CEREAL PRODUCT

BACKGROUND OF THE INVENTION

The present invention concerns a process for preparing cooked cereals by cooking and extrusion.

The preparation is known of cooked cereals by steam heat treatment, optionally under pressure, of a starch product such as milled cereals. Cooked cereals are thus obtained which have a characteristic underlying taste, which is reminiscent of the taste of cooked grain and/or a toasted taste and/or a biscuity taste.

A process for the preparation of cooked breakfast cereals is also known, for example through French patent 2640472, consisting of preparing a mixture of milled cereals having a moisture content of 14% to 22% by weight, and then extruding the said mixture. The extruded product thus obtained can then be dried and then ground and agglomerated so as to obtain grains which can easily be dissolved in a liquid.

Another process for preparing breakfast cereals consists of preparing a mixture of milled cereals and sugars, and introducing this mixture into a twin-screw extruder with a sufficient quantity of water so as obtain expanded pieces of cereal of the desired density, the said pieces of cereal then being able to be coated in a syrup and then dried.

The cereals thus obtained do not, however, have an underlying taste comparable to the taste traditionally obtained, this being due to the fact that, at the time of extrusion, the cooking time is short, generally about a minute, whereas for more traditional processes, for example steaming, the heat processing time may vary from 15 minutes to one hour, or even more.

SUMMARY OF THE INVENTION

The object of the present invention is to mitigate the drawbacks of the prior art and to provide a process enabling cooked cereals to be prepared which have an appropriate underlying taste in spite of being obtained by extrusion.

The present invention thus provides a process for preparing cooked cereals in which a first mixture comprising at least one raw material chosen from the group consisting of starchy substances and soya, and water, is processed by heat, this first mixture is introduced into an extruder at the same time as a second mixture comprising at least one raw material which is also chosen from the group consisting of starchy substances and soya, and then the mixture thus obtained is extruded.

DETAILED DESCRIPTION OF THE INVENTION

In the remainder of the description, the term "raw material" will be used in the sense of "raw material chosen from the group consisting of starchy substances and soya". Stated parts and percentages are given by weight.

The present invention therefore consists of extruding a mixture comprising, on the one hand, part of the raw material which has previously been processed by heat and, on the other hand, the rest of the said raw material, added to the first part, just before extrusion.

The process according to the present invention therefore enables products to be prepared which have an appropriate underlying taste, while limiting, to the minimum, the residence time in the extruder and the temperature used, and therefore preserving the qualities of the raw materials (the vitamin content for example).

In addition, the present invention enables products to be prepared which have, on the one hand, an underlying taste similar to that of cereals obtained traditionally by steaming, and on the other hand, a form expanded more simply, by virtue of the extrusion stage.

Finally, these products are prepared using a manufacturing system which is much more flexible, and less costly, than the systems of the prior art.

Thus, according to the present invention, a first mixture consisting of a raw material according to the invention and water, is processed by heat.

According to the invention, a durum wheat, common wheat, rice or maize flour or semolina may be chosen as a raw material, or even soya or potato flour or semolina, alone or in a mixture.

Water is added to the said raw material so as to obtain a mixture which can be transported in bulk, having a dry material content of about 20% to 85%.

Sugars such as saccharose or glucose can be added to the said first mixture, as well as flavourings or additives such as preservatives, or pH modifiers.

Enzymes such as amylases can also be added to the said first mixture so as to modify its viscosity, which may enable less water to be added.

The adding of enzymes may also enable certain characteristics of the final product, including organoleptic characteristics, to be modified, such as the taste, texture or appearance.

The first mixture thus obtained is then processed by heat, preferably at 50° to 160° C., for 10 to 180 minutes, for example in a vat with a double shell into which steam is injected.

It is clear that the heat processing time depends on the temperature of the said processing, a shorter time entailing, to obtain an equivalent taste, a higher temperature, possibly to the detriment of certain nutrients. It is within the competence of a person skilled in the art to choose an appropriate time and temperature to obtain a final product as desired in which the flavours will have had time to develop.

10% to 98% of the total mixture can be processed by heat, while bearing in mind the fact that the greater the proportion of the first mixture, the greater will be the "gain" in taste. Preferably, 50% to 65% of the total mixture is processed by heat.

It is possible to dry the first mixture thus obtained partially, for example on a drum dryer.

A first heat-processed mixture is thus obtained, having a marked cooked taste and being transportable by standard means such as a screw conveyor or pumps.

The first heat-processed mixture is then introduced into an extruder, at the same time as the second mixture, comprising the rest of the raw material according to the invention, is introduced therein.

Additives such as preservatives, vitamins and flavourings can be added to this second mixture.

It is also possible to add the rest of the necessary sugars to the second mixture.

The second mixture is preferably in powder form, so as to obtain a total mixture introduced into the extruder having a moisture content compatible with an extrusion stage, i.e., a dry material content of about 65% to 88%.

This is because an excessively low dry material content makes extrusion difficult (no retention in the extruder and/or no final expansion) and involves the necessity of eliminating excess water, before or during the said extrusion stage, whilst an excessively high dry material content blocks the extruder.

In a particular form of the invention, a previously prepared homogeneous mixture can be introduced into the extruder, consisting of the first and second mixtures. To do this, a booster screw can be used which takes and mixes the first and second mixtures before introducing them into the extruder.

In another embodiment, the first and second mixtures can be introduced at different points on the extruder, for example the first mixture in the feed section of the extruder and the second mixture in the following section downstream.

The extrusion can be carried out in a single or twin-screw extruder, in normal conditions, for example at 125°–135° C. for 20–60 seconds.

It is possible to coat and/or dry the final mixture obtained after extrusion.

A product is thus obtained which has the sought-for underlying taste, which can expand freely and immediately after being taken out of the extruder, or which can be shaped in the desired manner, for example in flakes.

EXAMPLES

The invention is illustrated in greater detail in the following example embodiments.

EXAMPLES 1

A first mixture is prepared comprising 25 kg of wheat flour, 15 kg of sucrose and water, having a dry material content of 75%, which is homogenised in a mill and the temperature of which is raised to 80° C.

The first mixture thus prepared is left to stand in a vat while maintaining its temperature at 75°–80° C. for about 2 hours, so as to develop the desired underlying taste.

A second mixture is also prepared comprising 40 kg of maize flour, 10 kg of sucrose, 6 kg of glucose and 2 kg of honey and having a dry material content of 89% to 90.2%.

The first mixture treated is introduced into a twin-screw extruder, at the same time as the rest of the ingredients forming the second mixture, so as to obtain a total load of 100 kg of materials excluding the addition of water.

The whole is extruded at 125°–135° C. for about 30 seconds, and then shaped and dried, using conventional techniques, at 60° C. for 30 minutes and then 160° C. for 1½ minutes. A cereal-type breakfast product with a pleasant taste is thus obtained.

As a comparison, a product with the same composition is prepared by a process consisting of preparing a mixture which has a dry material content of 87% and comprising 40 kg of maize flour, 25 kg of sucrose, 25 kg of wheat flour, 6 kg of glucose and 2 kg of honey, and then processing it with steam at 90° C. for 1 to 2 minutes and extruding it at 125°–135° C. for 30 seconds, before shaping it and drying it as before.

A control product is thus obtained, able to be used as breakfast cereal.

The products thus prepared are "reconstituted" by adding 120 ml of milk to 30 grammes of cereal, and the products obtained are offered to a group of eight experienced tasters.

The following tasting results are obtained:

| Taste characteristics | Control | Invention |
| --- | --- | --- |
| biscuit taste | slight | average |
| raw grain taste | 4.6 | 3.6 |
| cooked grain taste | 3.0 | 3.4 |
| toasted taste | 4.8 | 5.6 |
| caramel taste | 4.0 | 4.4 |
| brown sugar taste | 1.8 | 2.6 |

The higher the rating, the stronger the taste in question, given that the said ratings may go from 1 for a non-existent taste to 9 for a very pronounced taste.

The product according to the invention therefore has a taste profile which is closer to the sought-for tastes of cooked, toasted, biscuity grain than the product obtained by the process in a single stage.

EXAMPLES 2

In a manner similar to the one described in Example 1, a first mixture is prepared comprising 25 kg of wheat flour, 15 kg of sucrose and water, having a dry material content of 75%, which is homogenised in a mill and the temperature of which is raised to a given temperature as defined in the following table.

The first mixture thus prepared is left to stand in a vat while its temperature is maintained at this temperature for a length of time as defined in the following table. A second mixture comprising 40 kg of maize flour, 10 kg of sucrose, 6 kg of glucose and 2 kg of honey and having a dry material content of 89% to 90.2% is also prepared. The first mixture processed is introduced into a twin-screw extruder, at the same time as the rest of the ingredients forming the second mixture, and the whole is extruded at 125°–135° C., for about 30 seconds, and then shaped and dried in a similar manner to Example 1.

A breakfast cereal is thus obtained which is "reconstituted" by adding 120 ml of milk to 30 grammes of cereal, and then the product obtained is offered to a group of 8 experienced tasters.

The following results are obtained:

| Processing temperature | Processing time | Remarks |
| --- | --- | --- |
| 40°–50° C. | 40 min | No marked taste or very slight taste |
| 75°–80° C. | 10 min | No marked taste |
| 75°–80° C. | 3 hrs | Product too dark and too bitter |
| 75°–80° C. | 2 hrs | Appropriate marked taste |

It is therefore established that the temperature and time are two related parameters, which it is possible to vary in order to obtain a product as desired.

EXAMPLES 3

In a manner similar to that described in Example 1, a first mixture is prepared, comprising 25 kg of wheat flour, 10 kg of sucrose and water, having a dry material content of 75%, which is homogenised in a mill and the temperature of which is raised to 80° C.

The first mixture thus prepared is left to stand in a vat, its temperature being maintained at 75°–80° C. for 2 hours.

A second mixture is also prepared comprising 40 kg of maize flour, 10 kg of sucrose, 6 kg of glucose and 2 kg of honey and having a dry material content of 89% to 90.2%. The first mixture processed, in a quantity as determined in the following table, is introduced into a twin-screw extruder, at the same time as the rest of the ingredients constituting the second mixture, in the quantities as mentioned in the table, and then the whole is extruded at 125°–135° C. for about 30 seconds and then shaped and dried in a similar way to Example 1.

A breakfast cereal is thus obtained which is "reconstituted" by adding 120 ml of milk to 30 grammes of cereal, and then the product obtained is offered to a group of 8 experienced tasters.

The following results are obtained:

| First/second mixture (by dry material content) | Remarks |
| --- | --- |
| 20/80 | No extra taste produced |
| 80/20 | Too large a quantity of water, making extrusion impossible. |

EXAMPLE 4

The first mixture is prepared comprising 20 kg of maize flour, 10 kg of sucrose, 2 kg of malt extract, 1 kg of maize oil and water, having a dry material content of 57%, which is homogenised in a mill and the temperature of which is raised to 75° C.

The first mixture thus prepared is left to stand in a vat, its temperature being maintained at 75°–80° C. for about 3 hours, so as to develop the desired underlying taste.

A second mixture is also prepared, comprising 65 kg of maize flour, 1 kg of sodium chloride, 0.5 kg of calcium carbonate and having a dry material content of 87% to 88%.

The first mixture processed is introduced into a twin-screw extruder, at the same time as the rest of the ingredients constituting the second mixture, so as to obtain a total load of 100 kg of material excluding the addition of water.

The whole is extruded at 125°–135 C. for about one minute, and then turned into flakes and dried using conventional techniques. A cornflakes-type product, with a pleasant taste, is thus obtained.

For comparison, a product having the same composition is prepared by a process consisting of preparing, at the same time, a mixture having a dry material content of 87% and comprising 85 kg of maize flour, 10 kg of sucrose, 2 kg of malt extract, 1 kg of maize oil, 1 kg of sodium chloride and 0.5 kg of calcium carbonate, and then extruding it at 125°–135 C. for one minute before shaping it into flakes and drying it as before.

A control product is thus obtained.

The products thus prepared are "reconstituted" by adding 120 ml of milk to 30 grammes of cereal, and these products are offered to a group of 8 experienced tasters.

The following tasting results are obtained:

| Taste characteristics | Control | Invention |
| --- | --- | --- |
| Taste of raw grain | 5.2 | 3.1 |
| Taste of cooked grain | 2.8 | 3.3 |
| Toasted taste | 4.8 | 5.4 |
| Brown sugar taste | 1.2 | 1.9 |

The notation system is the same as that of Example 1.

Thus it is established that the process of the invention enables a product to be obtained which has a taste of cooked grain and brown sugar and a toasted taste which is stronger than that obtained by the process in a single stage.

We claim:

1. A process for preparing a cooked cereal product comprising the steps of:
   preparing a first composition, having a dry matter contents of 20% to 85% by weight, comprising water and at least one raw material selected from the group consisting of starchy substances and soya;
   heating and maintaining the first composition at a temperature of from 50° C. to 160° C. for from 10 minutes to 180 minutes to obtain a heat-treated composition; and
   introducing the heat-treated composition and a second composition comprising at least one raw material selected from the group consisting of starchy substances and soya into an extruder and extrusion-cooking the two compositions for 20 seconds to 60 seconds at 125° C. to 135° C. to obtain a cooked cereal product.

2. A process according to claim 1 wherein the first composition is heated and maintained at a temperature of from 75° C. to 160° C.

3. A process according to claim 1 wherein the first composition is heated and maintained at a temperature of from 75° C. to 80° C. for from 120 minutes to 180 minutes.

4. A process according to claim 1 wherein the first composition has a dry matter content of 57% to 75% by weight.

5. A process according to claim 1 wherein the first composition comprises 10% to 98% by weight of a total dry weight of the first composition and the second composition introduced into the extruder.

6. A process according to claim 1 wherein the first composition comprises 50% to 65% by weight of a total dry weight of the first composition and the second composition introduced into the extruder.

7. A process according to claim 1 wherein the heat-treated composition and the second composition introduced into the extruder have a combined dry matter content of from about 65% to 88% by weight.

8. A process according to claim 1 further comprising drying the cooked cereal product.

9. A process according to claim 1 further comprising admixing the heat-treated composition and the second composition before introducing them into the extruder.

10. A process according to claim 1 wherein the heat-treated composition and the second composition are introduced into the extruder at different positions in the extruder.

11. A process according to claim 10 wherein the second composition is introduced into the extruder at a position downstream of the position where the heat-treated composition is introduced.

12. A process according to claim 1 wherein the first composition is heated by steam in a vat.

13. A process according to claim 1 wherein the first composition further comprises a sugar.

14. A process according to claim 13 wherein the sugar is sucrose.

15. A process according to claim 1 wherein the second composition further comprises a sugar.

16. A process according to claim 15 wherein the sugar is sucrose.

17. A process according to claim 1 wherein the first composition comprises wheat flour, rice flour or maize flour.

18. A process according to claim 1 wherein the second composition comprises wheat flour, rice flour or maize flour.

19. A process according to claim 1 wherein the second composition further comprises honey.

20. A process according to claim wherein the second composition further comprises a preservative, vitamin or flavoring.

* * * * *

UNITED STATES PATENT AND TRADEMARK OFFICE
CERTIFICATE OF CORRECTION

PATENT NO. : 5,451,423   Page 1 of 2
DATED : September 19, 1995
INVENTOR(S) : Jean Noël HUET It is certified that error appears in the above-indentified patent and that said Letters Patent is hereby corrected as shown below:

Title page, in item [19], the heading should be

--UNITED STATES PATENT

Huet--.

Title page, the item [75] Inventor designation should be

-- Jean Noël Huet--.

Title page, in item [56] "References Cited, U.S. Patent Documents", change "4,790,997" to --4,790,996--.

Under the heading FOREIGN PATENT DOCUMENTS, change the patent number of the first-listed patent from "78356" to --783,756--.

UNITED STATES PATENT AND TRADEMARK OFFICE
CERTIFICATE OF CORRECTION

PATENT NO. : 5,451,423
DATED : September 19, 1995
INVENTOR(S) : Jean Noel HUET

It is certified that error appears in the above-indentified patent and that said Letters Patent is hereby corrected as shown below:

Column 6, line 10, (line 4 of claim 1) change "contents" to --content--.

Column 8, line 5 (line 1 of claim 20), after "claim", insert 1.

Signed and Sealed this

Twentieth Day of February, 1996

Attest:

BRUCE LEHMAN

*Attesting Officer*    *Commissioner of Patents and Trademarks*